F. J. MANNING.
PRESSURE GAGE.
APPLICATION FILED AUG. 27, 1915.
1,274,921.
Patented Aug. 6, 1918.
Fig-1-
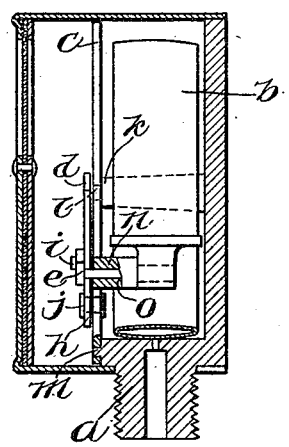
Fig-2-
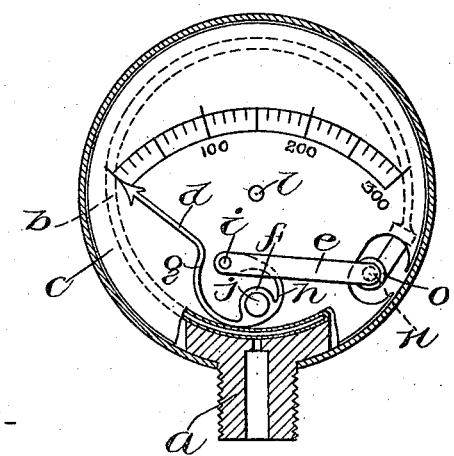
Fig-3-
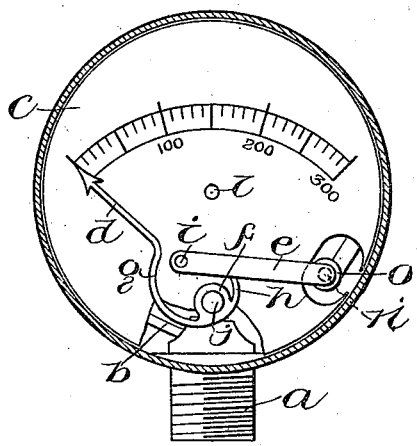
INVENTOR=
FRANCIS J. MANNING
by
ATTORNEYS

UNITED STATES PATENT OFFICE.

FRANCIS J. MANNING, OF MEDFORD, MASSACHUSETTS, ASSIGNOR, BY MESNE ASSIGN-MENTS, TO AMERICAN STEAM GAUGE & VALVE MANUFACTURING COMPANY, OF BOSTON, MASSACHUSETTS, A CORPORATION OF MASSACHUSETTS.

PRESSURE-GAGE.

1,274,921. Specification of Letters Patent. Patented Aug. 6, 1918.

Continuation of application Serial No. 798,198, filed October 30, 1913. This application filed August 27, 1915. Serial No. 47,614.

*To all whom it may concern:*

Be it known that I, FRANCIS J. MANNING, a citizen of the United States, and resident of Medford, in the county of Middlesex and State of Massachusetts, have invented certain new and useful Improvements in Pressure-Gages, of which the following is a specification.

The present invention relates to pressure gages and has for its object to provide a simplified means of adjustment for correcting the position and amplitude of swing of the pointer or hand by which pressures acting upon the gage are indicated on a dial. It is necessary that gages made in quantities according to standard patterns should be capable of adjustment in order that each individual gage may be correctly calibrated in connection with the spring or other pressure measuring element, and the dial, which form parts of the gage. These adjustments involve changing the amplitude of movement of the pointer for the same amount of the movement of the spring tube or other pressure measuring element, and shifting the position of the pointer or indicator without altering its amplitude of movement. Heretofore these adjustments have usually been made by means of adjustable links and other connections between the spring tube and the pointer or indicator, involving a plurality of parts movable relatively to each other and secured in an adjusted position by means of clamping screws or equivalent elements. That is, the means heretofore usually employed for securing the adjustments indicated above necessitated many parts additional to what would have been sufficient if it were not for the necessity of providing an adjustment.

The object of the present invention is to produce a construction which will enable the adjustments above indicated to be made, without necessitating the use of any more parts than would be required if no adjustments were contemplated. In other words, my object is to secure complete adjustability in a gage with no more parts than would be required simply to perform indicating functions in a non-adjustable gage.

The present invention was first described and claimed in an application filed by me October 30, 1913, Serial Number 798,198, of which application the present is a continuation. The precise nature of the invention and the means by which it is carried into effect appear from the following description, in connection with the drawings, of a gage embodying the preferred form of my invention.

In the drawings,

Figure 1 is a central vertical section of the gage embodying the invention.

Fig. 2 is a front elevation of the same with parts broken away.

Fig. 3 is a similar view showing a modification.

The gage as a whole may be of any ordinary or other construction, having a nipple $a$ adapted to be mounted in any convenient manner in connection with the pipe or container for the fluid of which the pressure is to be measured. The gage is equipped with the usual spring tube or Bourdon spring $b$, which communicates in any ordinary or other desired manner with the nipple so as to receive the fluid under pressure and to be distorted thereby, with consequent movement of the free end of the spring. $c$ represents the dial of the gage and $d$ represents the pointer or indicator thereof. $e$ represents a link for transmitting movement from the closed free end of the spring to the pointer.

The main feature of the invention consists in the construction of the pointer whereby the adjustments for amplitude of swing and for location may be effected. To this end the indicating part of the pointer is connected with the hub portion $f$ thereof by means of a curved arm $g$, which might be otherwise described as a bend in the indicating arm. A second curved arm $h$ extends from the hub of the indicator and is connected with the link $e$ by pivot $i$. Preferably the pointer with its hub, the bent portion $g$ and the curved arm $h$, are all made in one piece, stamped or cut from metal which is bendable and non-resilient so that it may be given a permanent set of such proportions that the bent part and the curved arm may be bent widely and repeatedly without breaking. The indicator is pivoted on a stud $j$.

Evidently the distance between the stud $j$ and the pivot $i$ is the length of lever arm upon which the link e acts to move the indicator. This effective lever arm can be increased or diminished by moving the pivot i away from or toward the stud j, such movement being effected by bending the arm h, in one direction or the other. Thus bending of the arm h changes the angle through which the indicator is swung in consequence of a given movement of the spring tube, and thereby affects the amplitude of movement of the indicator. By bending arm g more or less the position of the indicator may be altered without affecting its amplitude of swing, whereby the indicator may be accurately located in the zero position.

In the arrangement shown in Figs. 1 and 2 the stud j is mounted on the dial c, having a reduced end passing through a hole in the dial and upset or headed over at the back of the dial. The indicator may, however, be pivoted on a post or stud rising from the part to which the spring tube is attached, as shown in Fig. 3. The dial itself is mounted upon a post k which projects from the back or base portion of the gage, a tip l on such post being contained and upset in a hole in the dial. A small projection m on the part to which the spring tube is attached is similarly fastened in the dial to hold the latter from rotating. In this way the dial is securely held without the use of screws or separate rivets.

The connection between the link and the spring tube is accomplished in a simple manner by a pin n fixed on the link and passing freely into an opening in a head o secured to the spring.

The gage having the above features possesses the following advantages, among others. First, all of the adjustments necessary to make the gage accurate can be made easily and quickly by bending either the arm h or the arm g or both arms. Second, the adjustments are made without loosening any clamps or other connections, and when once made are permanent without need of setting up any screws or clamps. Thus there is no danger of the gage getting out of adjustment through failure of the adjuster to tighten up the connections. Third, the gage, having fewer parts can be furnished for a lower price, because of reduced cost for materials, and a smaller labor cost resulting from saving in the time of assembling the fewer parts of the gage, and of time in adjusting. Fourth, the dial is more secure on account of not being dependent upon screws to hold it in place.

What I claim and desire to secure by Letters Patent is:

1. A gage including in its construction a dial plate, a pointer or hand, a rivet connecting said pointer pivotally and in a permanent manner to said dial plate, said pointer having a bowed portion and having also a curved arm, a link pivoted to the end of said curved arm, said bowed portion and arm being flexible and capable of being bent so as to receive a permanent set whereby to alter the position of the pivot connection between the arm and link with respect to the rivet and to shift the position of the pointer respectively, a base portion having a post projecting therefrom and through the dial plate, said post being upset or headed over at its end to retain the dial plate thereon, a Bourdon tube mounted upon said base and having a head provided with an opening at its free end, and a pin or stud rigidly connected to said link and projecting therefrom perpendicularly to the length of the link and contained freely and rotatably in said opening.

2. In a gage, the combination with a pressure actuated member, a pivotally mounted indicator having an arm and an indicating portion both in the same plane, and a link pivotally connected with said arm and with the pressure actuated member, said arm being curved or bowed between the pivot point of the indicator and the connection with the link, whereby the distance between said pivot point and connection may be altered by bending the arm.

3. In a gage of the character described, an indicating pointer made from a single piece of metal, which is bendable and non-resilient so that it may be given a permanent set, having a relatively long pointing arm, a relatively short operating arm, and an intermediate portion adapted to be pivotally mounted, the operating arm being curved around the pivoting portion and toward the indicating arm, and the indicating arm having a bowed part adjacent to the pivoting portion which is curved away from the operating arm.

4. A pressure gage comprising a pressure measuring movable element, an indicator comprising a pivotally mounted indicating arm having an offset bowed part between its indicating part and the pivot and a second curved arm joined to the first arm, and a link pivoted to said second arm and connected to said measuring element, the said arms being of bendable and non-resilient metal capable of being given a permanent set, whereby one may be bent to change the amplitude of movement of the indicator, and the other may be bent to shift the position of the indicator.

In testimony whereof I have affixed my signature.

FRANCIS J. MANNING.

Copies of this patent may be obtained for five cents each, by addressing the "Commissioner of Patents, Washington, D. C."